United States Patent [19]

Schlagmüller

[11] 4,296,717
[45] Oct. 27, 1981

[54] DRIVE ARRANGEMENT FOR AUXILIARY AGGREGATES OF AN INTERNAL COMBUSTION ENGINE

[75] Inventor: Walter Schlagmüller, Schwieberdingen, Fed. Rep. of Germany

[73] Assignee: Robert Bosch GmbH, Stuttgart, Fed. Rep. of Germany

[21] Appl. No.: 44,553

[22] Filed: Jun. 1, 1979

[30] Foreign Application Priority Data

Sep. 2, 1978 [DE] Fed. Rep. of Germany ....... 2838343

[51] Int. Cl.³ .............................................. F02F 7/00
[52] U.S. Cl. ................................ 123/195 A; 474/86; 474/87; 474/171
[58] Field of Search ........... 123/195 A, 198 R, 198 C; 74/219

[56] References Cited

U.S. PATENT DOCUMENTS

2,916,024 12/1959 Dodge ............................ 123/195 A
3,361,000 1/1968 Buchwald ............................ 74/219

FOREIGN PATENT DOCUMENTS

2318745 10/1974 Fed. Rep. of Germany ... 123/195 A
2415726 10/1975 Fed. Rep. of Germany ... 123/195 A Primary Examiner—Ronald B. Cox
Attorney, Agent, or Firm—Michael J. Striker

[57] ABSTRACT

A drive arrangement for auxiliary aggregates of an internal combustion engine, especially for motor vehicles is constructed as a two-speed drive, that is at operation of the internal combustion engine at low speeds the auxiliary aggregates are driven from the drive shaft of the engine, whereas at operation of the internal combustion engine at high speeds the auxiliary aggregates are driven from the cam shaft of the engine over an intermediate pulley provided with a free wheel clutch. During low speed of the engine the auxiliary aggregates are driven from a pulley freely rotatably mounted on the drive shaft of the engine but connectable thereto by a centrifugal clutch, which at high speed of the drive shaft disconnects the drive of the pulley by the drive shaft of the engine while the free wheel clutch engages. The auxiliary aggregates, respectively the pulleys thereof, are located in one plane with the pulley on the drive shaft and the intermediate pulley. This provides for a space-saving arrangement and a drive with relatively few parts.

8 Claims, 3 Drawing Figures

DRIVE ARRANGEMENT FOR AUXILIARY AGGREGATES OF AN INTERNAL COMBUSTION ENGINE

BACKGROUND OF THE INVENTION

The present invention relates to a drive arrangement for auxiliary aggregates of an internal combustion engine, especially for motor vehicles. Such a drive known in the art is a belt drive which is constructed in such a manner and the auxiliary aggregates are arranged so that they are driven by at least two parallel extending belt drives. This requires not only a large mounting space, but especially also a larger expenditure for belt drives.

SUMMARY OF THE INVENTION

It is, therefore, an object of the present invention to provide a drive arrangement for the auxiliary aggregates of an internal combustion engine in which the necessary mounting space is reduced and the drive may be constructed with a smaller number of elements than in such drive arrangements known in the art.

With these and other objects in view, which will become apparent as the description proceeds, the drive arrangement according to the present invention mainly comprises a combustion engine having a drive shaft and a cam shaft driven by the drive shaft, a first pulley freely rotatably mounted on the drive shaft, centrifugal clutch means on the drive shaft for connecting the first pulley to the drive shaft when the latter rotates up to a predetermined speed and for disconnecting the drive of the first pulley by the drive shaft when the latter rotates above this predetermined speed, an intermediate pulley having a free wheel coupling driven at least indirectly by the cam shaft, a belt connecting the first pulley with the intermediate pulley, a plurality of auxiliary aggregates each having a shaft and a pulley fixedly mounted thereon, in which the mentioned first pulley, the auxiliary pulley and the pulleys of the auxiliary aggregates are located in one plane and the belt connecting the first pulley to the intermediate pulley extends also about the pulleys of the intermediate aggregates, whereby during rotation of the drive shaft up to the predetermined speed the auxiliary aggregates are driven by the first pulley, while when the drive shaft rotates above the predetermined speed the auxiliary aggregates are driven by the intermediate pulley which is at least indirectly driven by the cam shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
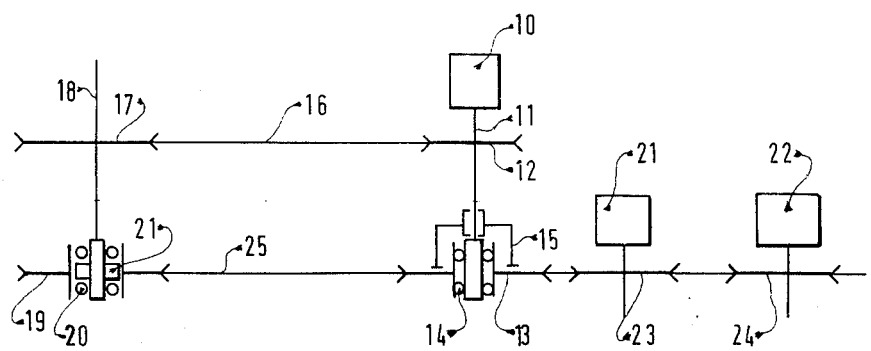
FIG. 1 is a schematic illustration of a first embodiment according to the present invention.
Figure 2:
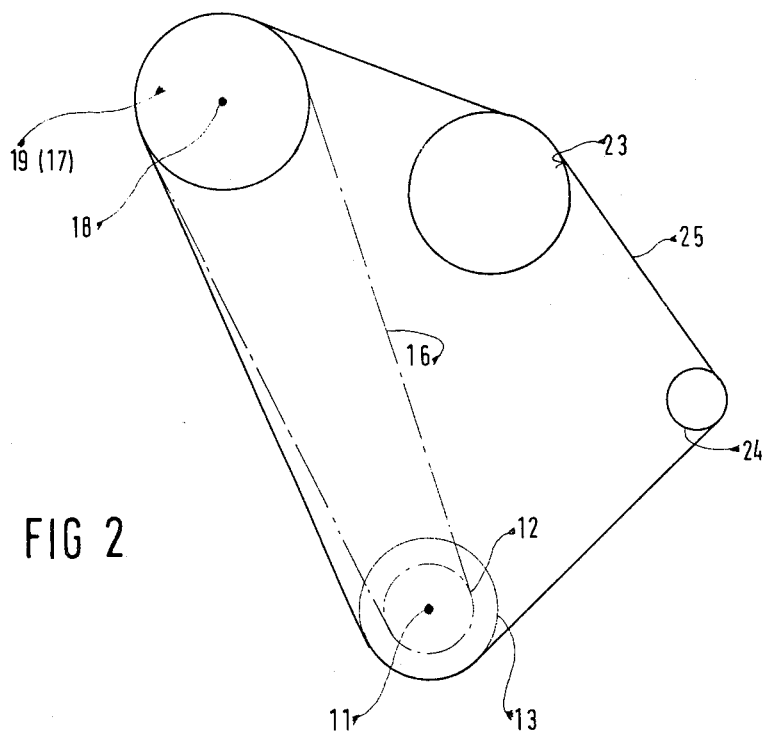
FIG. 2 is a top view of the drive arrangement shown in FIG. 1.

Referring first to FIGS. 1 and 2, it will be seen that the drive arrangement according to the present invention may comprise an internal combustion engine 10 having a drive shaft 11 on which a pulley 12 is fixedly mounted for rotation therewith, as well as a further pulley 13 which is mounted on the shaft 11 by means of a ball bearing 14 so that the pulley 13 may freely rotate with regard to the shaft 11. Mounted on the shaft 11 is a further centrifugal clutch which is operatively connected to the pulley 13 for coupling the pulley 13 to the shaft 11 or for disconnecting the drive between the shaft 11 and the pulley 13, depending on the rotational speed of the shaft 11.

The pulley 12 drives over a belt or chain 16 a pulley 17 which is fixedly mounted on the cam shaft 18 of the internal combustion engine for rotation therewith. An intermediate pulley 19 is mounted by means of a ball bearing 20 on the cam shaft 18 and the intermediate pulley is provided with a free wheel clutch 19' driven by the cam shaft 18.

The plurality of auxiliary aggregates to be driven by the drive arrangement may, for instance, comprise a water pump 21 and a generator 22, and the auxiliary aggregates 21 and 22 are arranged in such a manner that the pulleys 23 and 24, respectively mounted on the shafts of the auxiliary aggregates, are in one and the same plane with the pulley 13 and the intermediate pulley 19. A single belt 25 extends, as best shown in FIG. 2, about the pulley 13 on the drive shaft 11 of the internal combustion engine, the intermediate pulley 19 and the pulleys 23 and 24 of the auxiliary aggregates 21 and 22. The drive of all these elements will be carried out, if the internal combustion engine rotates up to a predetermined speed in which the coupling 15 is engaged with the pulley 13, from the shaft 11. Thereby the intermediate pulley 19 will, due to the free wheel coupling 19', overrunning, that is the intermediate pulley 19 will free wheel on the cam shaft 18.

If now the internal combustion engine is shifted to a speed higher than the predetermined low speed, the centrifugal clutch 15 will disconnect the drive of the pulley 13 by the shaft 11 and the drive will now proceed over the pulleys 12 and 17 as well as the intermediate pulley 19, whereby the free wheel clutch 19' connects the pulley 19 to the cam shaft 18 for rotation therewith. The drive of the auxiliary aggregates 21 and 22 takes now place over the cam shaft 18 and the intermediate pulley 19.

By suitable selection of the diameters of the pulleys 13 and 19 it is possible to obtain the desired step in the transmission ratio (about 1 to 1.7), while the possible step in the transmission ratio is from a theoretical 1:1 to about 1:5.

Figure 3:
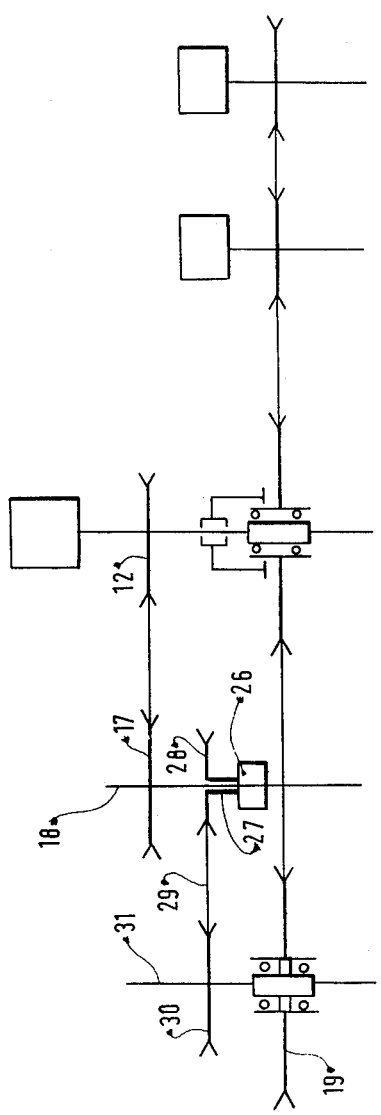
FIG. 3 is a schematic illustration of a second embodiment according to the present invention.

The embodiment illustrated in FIG. 3 differs from the above-described embodiment in that the drive of the intermediate pulley 19 is not carried out directly from the cam shaft 18, but indirectly from a further auxiliary aggregate 26, for instance a fuel injection pump, which is driven by the cam shaft 18. The shaft 27 of the fuel injection pump carries a pulley 28 for rotation therewith, which over a belt 29 drives a pulley 30 which is fixedly mounted on a third shaft 31 for rotation therewith, which third shaft 31 extends parallel to the cam shaft 18. The pulley 19 is in this case mounted by the ball bearing 20 on the third shaft 31 which drives the free wheeling clutch 19' of the pulley 19. Otherwise, the drive arrangement shown in FIG. 3 is constructed in the same manner as the above-described drive arrangement shown in FIGS. 1 and 2, that is, at the rotation of the internal combustion engine at low speed, the pulleys 23 and 24 of the auxiliary aggregates 21 and 22 are driven from the pulley 13 on the shaft 11, while the centrifugal clutch 15 is engaged with the pulley 13, whereas when the internal combustion engine is shifted to a speed higher than the predetermined low speed, the auxiliary aggregates are driven from the intermediate pulley 19.

It will be understood that each of the elements described above, or two or more together, may also find a useful application in other types of arrangements for auxiliary aggregates of an internal combustion engine differing from the types described above.

While the invention has been illustrated and described as embodied in a drive arrangement for auxiliary aggregates of an internal combustion engine, especially for motor vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive arrangement of the character described, especially for motor vehicles, comprising a combustion engine having a drive shaft and a cam shaft driven by the drive shaft; a first pulley freely rotatably mounted on said drive shaft; centrifugal clutch means on said drive shaft for connecting said first pulley to said drive shaft when the latter rotates up to a predetermined speed and for disconnecting the drive of said first pulley by said drive shaft when the latter rotates above said predetermined speed; an intermediate pulley having a free wheel coupling driven at least indirectly by said cam shaft; a belt connecting said first pulley with said intermediate pulley; a plurality of auxiliary aggregates each having a shaft and a pulley fixedly mounted thereon, said first pulley, said intermediate pulley and the pulleys of said auxiliary aggregates being located in one plane and said belt connecting said first pulley to said intermediate pulley extending also about the pulleys of said auxiliary aggregates, whereby during rotation of said drive shaft up to said predetermined speed said auxiliary aggregates are driven by said first pulley and when said drive shaft rotates above said predetermined speed said auxiliary aggregates are driven by said intermediate pulley which is at least indirectly driven by said cam shaft.

2. A drive arrangement as defined in claim 1, wherein said cam shaft is driven from said drive shaft by a second pulley mounted on said drive shaft for rotation therewith, a third pulley mounted on said cam shaft for rotation with the latter, and a belt extending about said second and third pulleys.

3. A drive arrangement as defined in claim 2, wherein said intermediate pulley is mounted on said cam shaft.

4. A drive arrangement as defined in claim 3, and including an antifriction bearing mounting said first pulley on said drive shaft and a further antifriction bearing mounting said intermediate pulley on said cam shaft.

5. A drive arrangement as defined in claim 2, wherein a further auxiliary aggregate is mounted on said cam shaft for rotation therewith, and wherein said intermediate pulley is freely turnably mounted on a third shaft carrying said free wheel coupling and including a transmission between said cam shaft and said third shaft.

6. A drive arrangement as defined in claim 5, wherein said third shaft extends parallel to said cam shaft, and wherein said transmission comprises a pulley fixed to the cam shaft for rotation therewith, an additional pulley fixed to said third shaft for rotation with the latter and a belt extending over said two pulleys.

7. A drive arrangement as defined in claim 1, wherein said auxiliary aggregates comprise a water pump and a generator for said internal combustion engine.

8. A drive arrangement as defined in claim 5, wherein said further aggregate is a fuel injection pump.

* * * * *